__United States Patent Office__

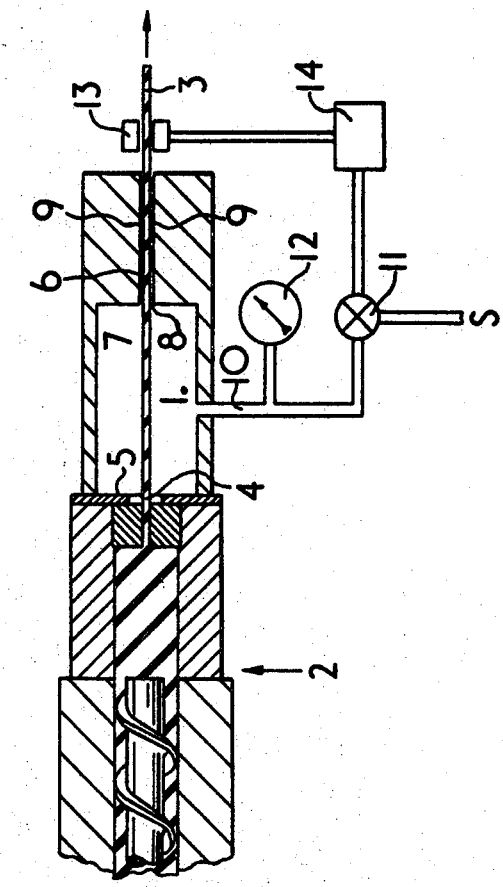

3,527,851
Patented Sept. 8, 1970

3,527,851
METHOD FOR CONTROLLING THE EXTRUSION OF VISCO-ELASTIC MATERIAL
Douglas Bulgin, Erdington, Birmingham, England, assignor to The Dunlop Company Limited, London, England, a British company
Filed Oct. 10, 1967, Ser. No. 674,177
Claims priority, application Great Britain, Oct. 15, 1966, 46,197/66
Int. Cl. B29h 3/00, 21/00
U.S. Cl. 264—40                                6 Claims

ABSTRACT OF THE DISCLOSURE

Method for extrusion whereby fluid pressure is applied to the extrudate immediately after it emerges from the extruder die and hence provide finer control for the dimensions of the product. A sensing device may be employed to measure the dimensions and a servo system incorporated so that the fluid pressure varies according to the valves of the sensed dimensions in order to maintain substantially constant extrudate dimensions.

---

This invention relates to an extrusion method which is applicable to extrudable materials such as rubber, plastics or other polymeric materials subject to dimensional change, such as swelling, after extrusion and hereinafter referred to as "rubber-like materials."

In an extruder, material is caused to flow through an extrusion orifice by extrusion pressures of the order of several thousand pounds per square inch. This process sets up internal stresses in the material so that after the extrudate emerges from a die orifice of the extruder of given cross-sectional dimensions, the material, being viscoelastic, relaxes to remove the internal stresses and attains cross-sectional dimensions at variance with those provided by the die orifice, e.g. the material may swell.

It is known to control the amount of swell by die box design, or by varying the constituents of the material, the material temperature, or the rate of extrusion of the material.

It is an object of the present invention to provide an extrusion method whereby the swell may be controlled after the extrudate has emerged from the die orifice.

According to the invention an extrusion method comprises extruding rubber-like material from a die orifice and subjecting the extrudate to fluid pressure above or below ambient and substantially at right angles to its direction of movement to control the cross-sectional dimentions of the extrudate.

Preferably at least one of the cross-sectional dimensions of the extrudate is continuously sensed after the extrudate has been subjected to fluid pressure to detect any variation from a predetermined value of the or each of said dimensions and any required correction applied by varying the fluid pressure substantially to maintain said predetermined value. The fluid creating the said pressure may be above or below ambient temperature.

The rate of relaxation of the extrudate has a logarithmic relationship with the time after emerging from the extruder. It is preferable therefore to apply the controlling pressure to the extrudate as soon as possible after it leaves the die orifice. Also, the changes in dimensions of the extrudate can be measured only a short time after the extrudate has emerged from the extruder since any further relaxation will be small compared with the relaxation that occurs immediately the extrudate leaves the extruder.

According to the invention also an extrusion apparatus comprises an extruder, a chamber through which extrudate of rubber-like material can be passed, means for applying fluid pressure to the interior of said chamber and means for varying the fluid pressure in said chamber above or below ambient.

Preferably the extrusion apparatus comprises means for sensing at least one of the cross-sectional dimensions of the extrudate after it emerges from the chamber to detect any variation from a predetermined value of the or each of said dimensions, and means for varying the fluid pressure in the chamber to apply any required correction substantially to maintain said predetermined value.

One embodiment of the method according to the invention will now be described by way of example only with reference to the accompanying diagrammatic drawing which depicts an apparatus suitable for carrying out the method.

A chamber 1 for containing air above or below atmospheric pressure is attached to an extruder 2 used for extruding a rubber strip 3 for ultimate use as the tread of a pneumatic tyre, so that the die orifice 4 of the extruder lies in one end wall 5 of the chamber. An exit hole 6 is provided in the wall 7 remote from the extruder having dimensions slightly larger than the predetermined cross-sectional shape of the strip passing through it. The small gap 8 left between the sides 9 of the exit hole and the strip effectively throttles the air escaping or entering and pressure is effectively maintained in the chamber. However, a small amount of air escaping or entering through the gap is useful, acting as a lubricant for the strip and preventing it from becoming distorted due to frictional drag effects. In addition the gap serves to modify the pressure within the chamber according to the dimensions of the strip and therefore provides an automatic increase or decrease of fluid pressure corresponding respectively to an increase or decrease in the dimensions of the strip.

Means for applying fluid pressure or suction to the chamber comprises an inlet pipe 10 connected between the chamber 1 and a valve 11. The valve is variably connectable to a source S of compressed air or vacuum and controls the fluid pressure within the chamber. A pressure gauge 12 is connected to the inlet pipe.

A pneumatic dimension sensing device 13 of known kind is located adjacent the exit hole 6 of the pressure chamber for measuring the cross-sectional dimensions of the strip 3 emerging from the pressure chamber. The sensing device is connected to pneumatic amplifier 14 so that a pressure proportional to the pressure shown by the sensing device is used for controlling the valve opening so that if the dimensions of the strip emerging from the exit hole fall below a predetermined value then the pressure in the chamber is reduced to allow the strip to swell a greater amount; conversely, if the dimensions of the strip exceed the predetermined value then the pressure is increased to reduce the amount of swell.

The pressure in the chamber may be varied during extrusion from below ambient atmospheric pressure to a positive pressure of the order of 200 pounds per square inch. The rate at which the strip emerges from the chamber also varies slightly since the cross-sectional dimensions of the strip after emergence from the die orifice vary and are controlled in the chamber to substantially constant values, thus varying the rate of emergence of the strip from the chamber.

In one alternative method which is a modification of the embodiment just described a sealing strip extends around the periphery of the exit hole for contacting the strip or other extrudate to provide a fluid pressure seal. This modification is more appropriate for instances where the pressurising fluid in the chamber is a liquid.

In other methods, also modifications of the aforementioned embodiment, alternative forms of dimension sensing devices may be used. For example the output from the pneumatic amplifier may be fed directly to the pressure chamber instead of actuating a valve for modifying the pressure of fluid from a separate source. Alternatively an electro-pneumatic converter for converting a pressure signal from the pneumatic sensing device into an electric signal may be used in conjunction with an electronic amplifier so that the electric signal is amplified and fed to an electrically operated pressure-reducing valve for controlling the pressure in the chamber.

In a further alternative method the pneumatic sensing device is replaced by pairs of spring-loaded, pivotally mounted rollers, one roller arranged on each opposite side of the extrudate and mechanically connected to a transducer e.g. a transformer, and amplifier so that an electrical signal proportional to the extrudate dimension is derived suitable for actuating the pressure reducing valve. However this method of sensing suffers from the disadvantage that the rollers may tend to distort the extrudate and hence this method has only limited application.

In all the aforementioned methods after passing through the chamber the extrudate continues to relax and may swell further to provide a final dimension within the required tolerance. However, the total amount of relaxation or swell of the extrudate will be within an acceptable tolerance figure compared with that which would have occurred but for the application of fluid pressure above and/or below ambient atmospheric pressure to the extrudate.

An extrudate made according to the extrusion method described will have substantially constant cross-sectional dimensions even though, for example, changes occur in material properties, composition and/or temperature in the extruder.

The pressure chamber may be displaced from a die orifice if required but the amount of displacement should be as small as possible. When the chamber is displaced it then comprises an entrance hole and an exit hole both of which act as throttling valves or are provided with sealing strips as the case may be.

Having now described my invention, what I claim is:

1. An extrusion method comprising extruding viscoelastic material from a die orifice into a pressure chamber, subjecting the extrudate in the pressure chamber to fluid pressure substantially only at right angles to the direction of movement of the extrudate, and passing the extrudate from the pressure chamber through an orifice of larger dimensions than the extrudate cross-section to permit passage of fluid with the extrudate through the orifice to prevent the extrudate from contacting the edges of the orifice, at least one of the dimensions of the extrudate being continuously sensed immediately after the extrudate has been subjected to the fluid pressure to detect any variation from a predetermined value of said dimensions and any required correction being applied by varying the fluid pressure substantially to maintain said predetermined value.

2. An extrusion method according to claim 1 wherein the temperature of the fluid creating said pressure is not equal to ambient temperature during extrusion.

3. An extrusion method according to claim 1 comprising passing the extrudate through said pressure chamber wherein the fluid pressure is applied and passing the extrudate out of said pressure chamber through said orifice of dimensions only slightly greater than the maximum dimensions of the extrudate so as to form a seal for said pressure chamber which is lubricated by the fluid escaping from or entering the pressure chamber.

4. An extrusion method according to claim 1 wherein the fluid is a gas.

5. An extrusion method according to claim 1 wherein the fluid is a liquid.

6. An extrusion method according to claim 1 in which the extrudate is in the form of a tread strip for a pneumatic tire.

References Cited

UNITED STATES PATENTS

| | | |
|---|---|---|
| 2,307,575 | 1/1943 | Davis. |
| 2,401,642 | 6/1946 | Hiltner et al. 264—176 |
| 2,566,854 | 9/1951 | Rhodes 264—40 |
| 2,649,618 | 8/1953 | Rhodes et al. 264—40 |
| 3,026,272 | 3/1962 | Rubens et al. 264—53 X |
| 3,064,073 | 11/1962 | Downing et al. 264—174 X |

ROBERT F. WHITE, Primary Examiner

J. H. SILBAUGH, Assistant Examiner

U.S. Cl. X.R.

18—2; 264—89, 93, 176